(12) United States Patent
Chang et al.

(10) Patent No.: US 11,965,226 B2
(45) Date of Patent: Apr. 23, 2024

(54) LITHIUM METAL POWDER, PREPARING METHOD THEREOF, AND ELECTRODE COMPRISING THE SAME

(71) Applicant: NATIONAL YANG MING CHIAO TUNG UNIVERSITY, Hsinchu (TW)

(72) Inventors: Jeng-Kuei Chang, Hsinchu (TW); Si-Hao Chen, Kaohsiung (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 17/967,646

(22) Filed: Oct. 17, 2022

(65) Prior Publication Data

US 2024/0068067 A1 Feb. 29, 2024

(30) Foreign Application Priority Data

Aug. 23, 2022 (TW) .................................. 111131662

(51) Int. Cl.
*C22B 3/22* (2006.01)
*B22F 9/04* (2006.01)
*C22B 26/12* (2006.01)

(52) U.S. Cl.
CPC .................. *C22B 3/22* (2013.01); *B22F 9/04* (2013.01); *C22B 26/12* (2013.01); *B22F 2009/045* (2013.01)

(58) Field of Classification Search
CPC ... C22B 3/22; C22B 26/12; B22F 9/04; B22F 2009/045

(Continued)

(56) References Cited

U.S. PATENT DOCUMENTS

| 6,706,447 B2 * | 3/2004 | Gao ....................... H01M 4/387 429/231.95 |
| 2012/0135278 A1 * | 5/2012 | Yoshie .................... H01M 8/20 429/105 |
| 2019/0388973 A1 * | 12/2019 | Wang ....................... B22F 9/04 |

FOREIGN PATENT DOCUMENTS

| CN | 110098381 A * | 8/2019 | .......... H01M 4/1395 |
| CN | 111725494 A * | 9/2020 | .......... H01M 4/0404 |

(Continued)

OTHER PUBLICATIONS

Physical Properties. In Knovel Solvents—A Properties Database. Retrieved from https://app.knovel.com/hotlink/itble/rcid:kpKSAPD005/id:kt00TYY8B1/knovel-solvents-properties/physical-properties. (Year: 2008).*

(Continued)

*Primary Examiner* — Anthony J Zimmer
*Assistant Examiner* — Zachary John Baum
(74) *Attorney, Agent, or Firm* — MUNCY, GEISSLER, OLDS & LOWE, P.C.

(57) ABSTRACT

The present invention relates to a lithium metal powder, a preparing method thereof, and an electrode including the same, wherein the method for preparing the lithium metal powder includes: providing a lithium metal material and a ultrasonication solution; mixing the lithium metal material and the ultrasonication solution to form a mixed solution; and ultrasonically vibrating the mixed solution to form a lithium metal powder, wherein the lithium metal powder is covered by a protective layer, and the aforementioned protective layer includes a protective layer material, wherein the protective layer material includes a sulfide, fluoride, or nitride, or a combination thereof.

9 Claims, 13 Drawing Sheets

(58) Field of Classification Search
USPC .................................................... 423/179.5
See application file for complete search history.

(56) References Cited

FOREIGN PATENT DOCUMENTS

| | | | | |
|---|---|---|---|---|
| CN | 113437296 | A | * | 9/2021 |
| JP | 2016076334 | A | * | 5/2016 |

OTHER PUBLICATIONS

Wang, A., Kadam, S., Li, H. et al. Review on modeling of the anode solid electrolyte interphase (SEI) for lithium-ion batteries. npj Comput Mater 4, 15 (2018). (Year: 2018).*
English translation of CN-110098381-A (Year: 2019).*
English translation of CN-111725494-A (Year: 2020).*
English translation of CN-113437296-A (Year: 2021).*
Guerfi, A., et al. LiFePO4 and graphite electrodes with ionic liquids based on bis(fluorosulfonyl)imide (FSI)—for Li-ion batteries. Journal of Power Sources 175 (2008) 866-873. (Year: 2008).*
Kim, H., et al. In Situ Formation of Protective Coatings on Sulfur Cathodes in Lithium Batteries with LiFSI-Based Organic Electrolytes. Adv. Energy Mater. 5 (2015) 1401792. (Year: 2015).*
Jarvis, C., et al. A lithium ion cell containing a non-lithiated cathode. Journal of Power Sources 146 (2005) 331-334. (Year: 2005).*
English translation of JP-2016076334-A Description (Year: 2016).*

* cited by examiner

LITHIUM METAL POWDER, PREPARING METHOD THEREOF, AND ELECTRODE COMPRISING THE SAME

CROSS REFERENCE TO RELATED APPLICATION

This application claims the benefits of the Taiwan Patent Application Serial Number 111131662, filed on Aug. 23, 2022, the subject matter of which is incorporated herein by reference.

BACKGROUND OF THE INVENTION

1. Field of the Invention

The present invention relates to a lithium metal powder, a preparing method thereof, and an electrode comprising the same. More specifically, the present invention relates to a lithium metal powder applicable to lithium batteries, a preparing method thereof, and an electrode comprising the same.

2. Description of Related Art

Lithium batteries have the advantages of high energy storage capacity, high output power, long lifespan for charge/discharge, low self-discharge, and no memory effect, so they are widely used. For example, they are used in electronic products or electric vehicles. Lithium metal battery (LMB) is seemed to be a match for lithium ion battery (LIB) in the future; and moreover, compared to the use of other anode materials such as graphite, lithium titanate (LTO), silicon, tin, germanium, the use of lithium metal has advantages of a very high theoretical capacity of about 3861 mAh/g, the lowest oxidation-reduction potential −3.04 V (compared to standard hydrogen electrode), and high electron and ionic conductivity, rendering it strong potential for further development.

During the charge/discharge process, most of the time, a solid electrolyte interphase (SEI) will be formed on the surface of the lithium metal negative electrode. The combination of different lithium salts and solvents leads to various SEI having different properties, and the SEI with poor properties will cause the low first-cycle Coulombic efficiency and the formations of disordered lithium dendrites, which are easy to pierce the separator membrane and bring safety concerns. In addition, the thickness of lithium foil required for lithium metal batteries today is about 20 μm, which is sufficient for efficient charge/discharge. However, the thickness of commercial lithium metal (about 200 μm) is much higher than the thickness that is required. Therefore, in order to pursue high energy density, it is imperative to reduce the thickness of lithium metal.

In summary, there is an urgent need to provide an improved lithium metal powder, a preparing method thereof, and an electrode comprising the same to eliminate or alleviate the above-mentioned problems.

SUMMARY OF THE INVENTION

In view of this, according to a first aspect of the present invention, there is provided a method for preparing lithium metal powder, comprising the following steps: providing a lithium metal material and a ultrasonication solution; mixing the lithium metal material and the ultrasonication solution to form a mixed solution; and ultrasonically vibrating the mixed solution to form a lithium metal powder, wherein the lithium metal powder is covered by a protective layer.

According to a second aspect of the present invention, there is provided a lithium metal powder, comprising: a lithium core; and a protective layer covering the lithium core, wherein the protective layer comprises a protective layer material, and the protective layer material comprises sulfide, fluoride, or nitride, or a combination thereof.

In addition, according to a third aspect of the present invention, there is provided an electrode, comprising: a substrate; and aforementioned lithium metal powder disposed on the substrate.

Furthermore, according to a fourth aspect of the present invention, there is provided a lithium battery, wherein the lithium battery may be a lithium battery comprising the aforementioned lithium metal electrode or a lithium battery comprising an electrode pre-lithiated with the aforementioned lithium metal powder.

In an embodiment of the present invention, the ultrasonication solution may comprise a metallic salt which may comprise lithium bis(trifluoromethanesulfonyl)imide (LiTFSI), lithium bis(fluorosulfonyl)imide (LiFSI), lithium hexafluorophosphate ($LiPF_6$), or a combination thereof. However, the present invention is not limited thereto.

In an embodiment of the present invention, the ultrasonication solution may comprise a solvent which may comprise ethers, carbonates, or a combination thereof. More specifically, the solvent may comprise at least one selected from the group consisting of ethylene carbonate (EC), propylene carbonate (PC), gamma-butyrolactone (γ-BL), δ-valerolactone (δ-VL), dimethyl carbonate (DMC), diethyl carbonate (DEC), ethyl methyl carbonate (EMC), ethyl acetate (EA), methyl butanoate (MB), ethyl butanoate (EB), dimethoxymethane (DMM), dimethoxy ethane (DME), diethoxyethane (DEE), tetrahydrofuran (THF), 2-methyltetrahydrofuran (2-Me-THF), 1,3-dioxolane (1,3-DL), 4-methyl-1,3-dioxolane (4-Me-1,3-DL) and 2-methyl-1,3-dioxolane (2-Me-1,3-DL). For example, the solvent may comprise ethylene carbonate and diethyl carbonate; or, it may comprise ethylene carbonate and dimethoxy ethane. However, the present invention is not limited thereto.

In an embodiment of the present invention, the volume ratio of ethylene carbonate to diethyl carbonate in the solvent may be in a range between 1:10 and 10:1, preferably between 2:8 and 8:2, more preferably between 4:6 and 6:4, and most preferably around 1:1. However, the present invention is not limited thereto. In addition, the volume ratio of ethylene carbonate to dimethoxy ethane in the solvent may be in a range between 1:10 and 10:1, preferably between 2:8 and 8:2, more preferably between 4:6 and 6:4, and most preferably around 1:1. However, the present invention is not limited thereto.

In an embodiment of the present invention, the particle size of the lithium metal powder may be in a range between 1 μm and 40 μm, preferably between 1 μm and 30 μm, more preferably between 1 μm and 25 μm, most preferably between 2 μm and 20 μm. However, the present invention is not limited thereto.

In an embodiment of the present invention, the mixed solution may be ultrasonically vibrated for an ultrasonication time ranging from 1 hour to 12 hours, preferably from 2 hours to 6 hours. However, the present invention is not limited thereto.

In an embodiment of the present invention, the mixed solution may be ultrasonically vibrated at an ultrasonication temperature ranging from 5° C. to 80° C., preferably from 10° C. to 70° C., more preferably from 15° C. to 60° C. However, the present invention is not limited thereto.

In an embodiment of the present invention, the protective layer may comprise a protective layer material, and the protective layer material comprises sulfide, fluoride, or nitride, or a combination thereof. However, the present invention is not limited thereto.

In an embodiment of the present invention, in a lithium battery comprising a lithium metal electrode, the aforementioned substrate may be copper. The thickness of the lithium layer formed by the lithium metal powder on the substrate may be in a range, for example, between 1 µm and 200 µm, preferably between 10 µm and 150 µm, more preferably between 10 µm and 100 µm, and most preferably between 10 µm and 50 µm.

In a lithium battery comprising a pre-lithiated electrode according to an embodiment of the present invention, the electrode may comprise a negative electrode material including graphite, silicon, or a mixture thereof. However, the present invention is not limited thereto.

The following will be combined with the drawings and detailed descriptions to make other objects, advantages, and novel features of the present invention more apparent.

DETAILED DESCRIPTION OF THE PREFERRED EMBODIMENT

Figure 1:
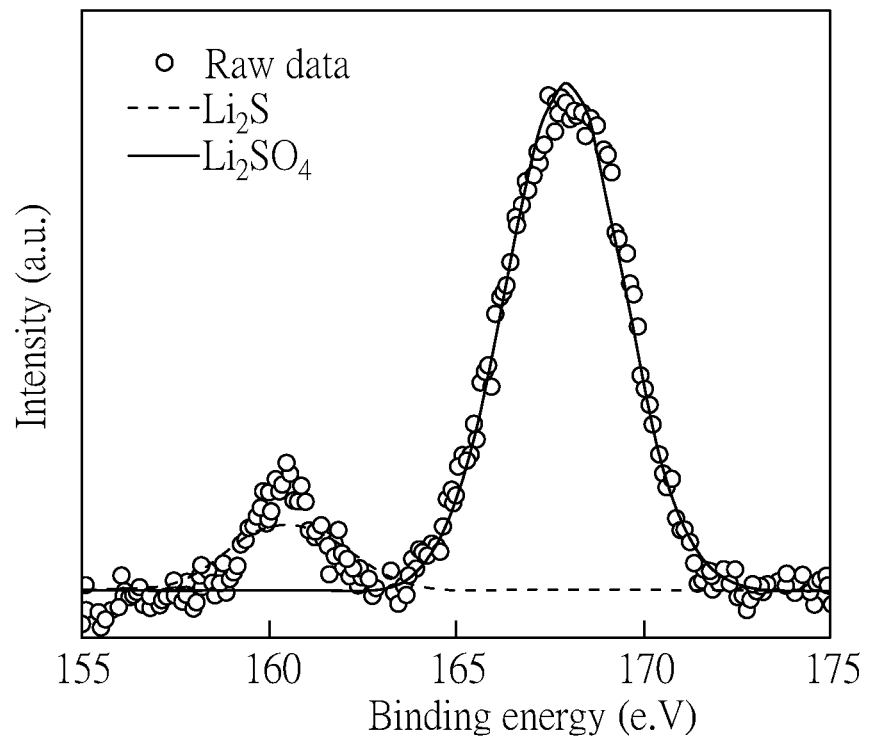
FIG. 1 shows an XPS spectrum of a lithium metal powder having a protective layer material comprising sulfide, according to an embodiment of the present invention.

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

Moreover, in the present specification, the terms, such as "top", "bottom", "left", "right", "front", "back", or "middle", as well as the terms, such as "on", "above", "under", "below", or "between", are used to describe the relative positions among a plurality of elements, and the described relative positions may be interpreted to include their translation, rotation, or reflection.

Moreover, in the present specification, when an element is described to be arranged "on" another element, it does not essentially means that the elements contact the other element, except otherwise specified. Such interpretation is applied to other cases similar to the case of "on".

Moreover, in the present specification, the terms, such as "preferably" or "advantageously", are used to describe an optional or additional element or feature, and in other words, the element or the feature is not an essential element, and may be ignored in some embodiments.

In addition, in the present specification, the so-called "suitable for" or "applicable to" another element refers to that the another element is not a part of the subject matter, but used to envisage the nature or application of the element on the exemplary or reference ground, except otherwise specified. Similarly, in the present application, the so-called an element is "suitable for" or "applicable to" a configuration or an action describes that the feature of the element, not that the configuration has been set or the action has been performed.

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

In one embodiment of the present invention, there is provided a method for preparing lithium metal powder, comprising the following steps: providing a lithium metal material and a ultrasonication solution; mixing the lithium metal material and the ultrasonication solution to form a mixed solution; and ultrasonically vibrating the mixed solution to form a lithium metal powder, wherein the lithium metal powder is covered by a protective layer. The aforementioned lithium metal powder comprises: a lithium core; and a protective layer covering the lithium core, wherein the protective layer comprises a protective layer material, and the protective layer material comprises sulfide, fluoride, or nitride, or a combination thereof. In addition, the particle size of the lithium metal powder is in a range between 3 μm and 30 μm.

Figure 2:
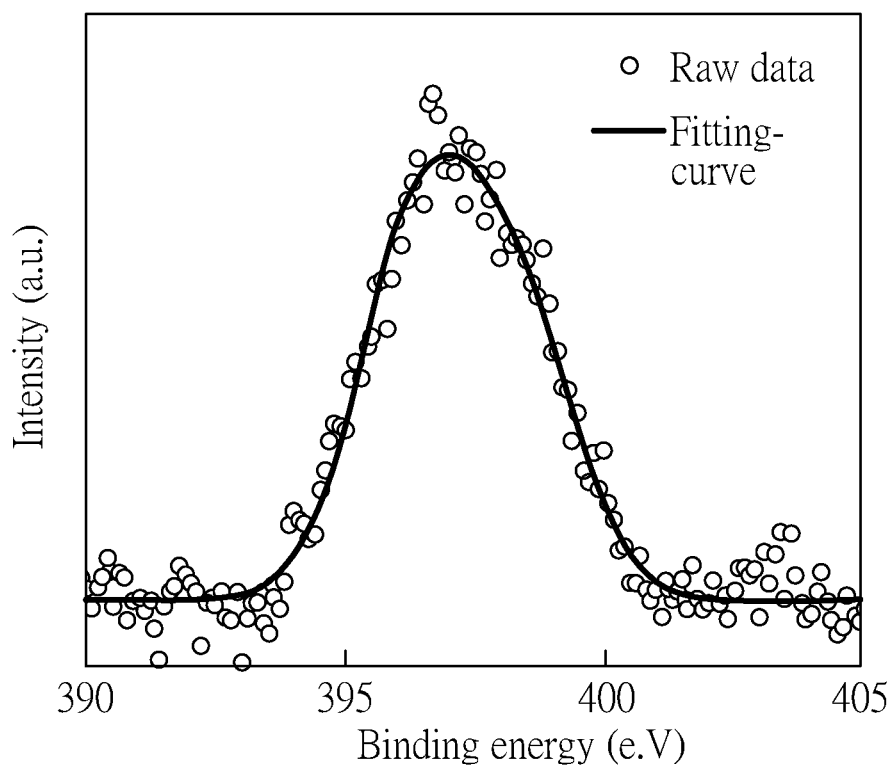
FIG. 2 shows an XPS spectrum of a lithium metal powder having a protective layer material comprising fluoride, according to an embodiment of the present invention.
Figure 3:
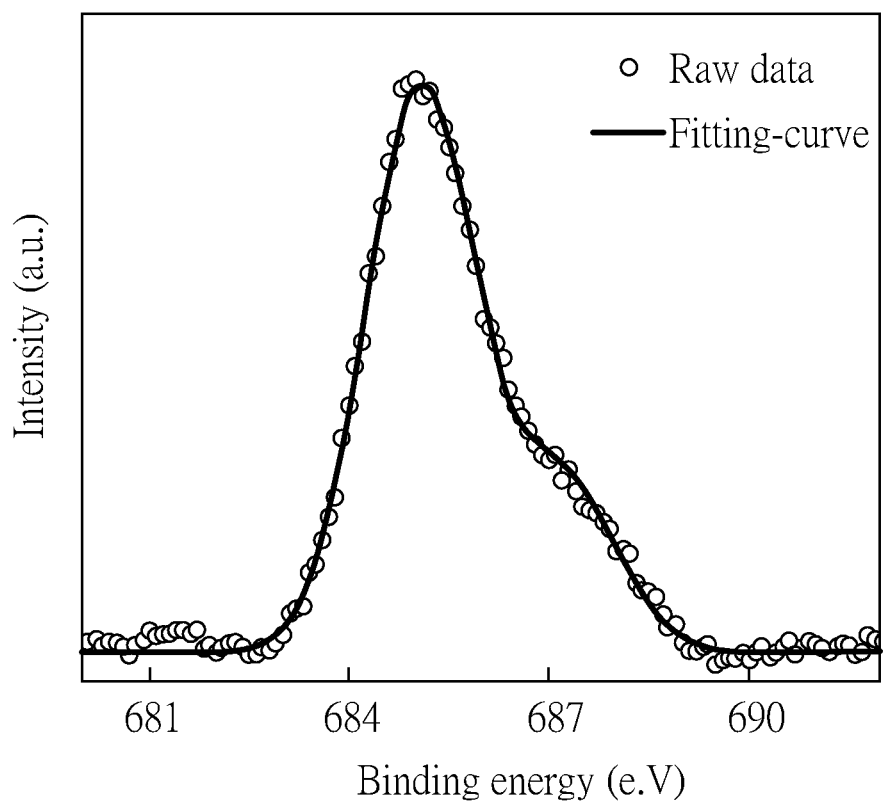
FIG. 3 shows an XPS spectrum of a lithium metal powder having a protective layer material comprising nitride, according to an embodiment of the present invention.
Figure 4:
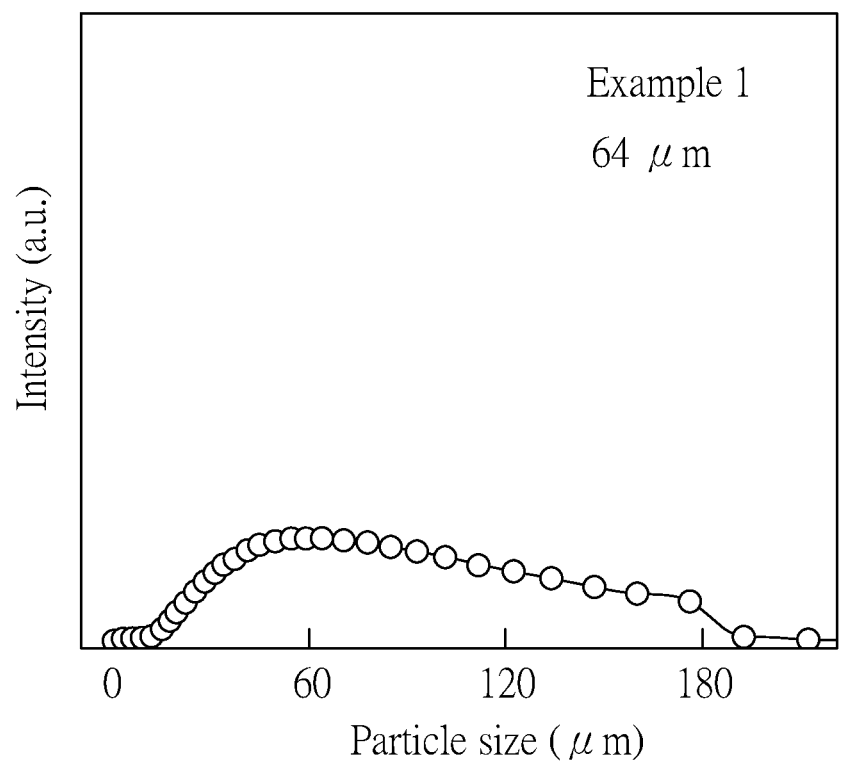
FIG. 4 to FIG. 7 show distribution diagrams of particle size of lithium metal powders according to Example 1 to Example 4 of the present invention, respectively.
Figure 5:
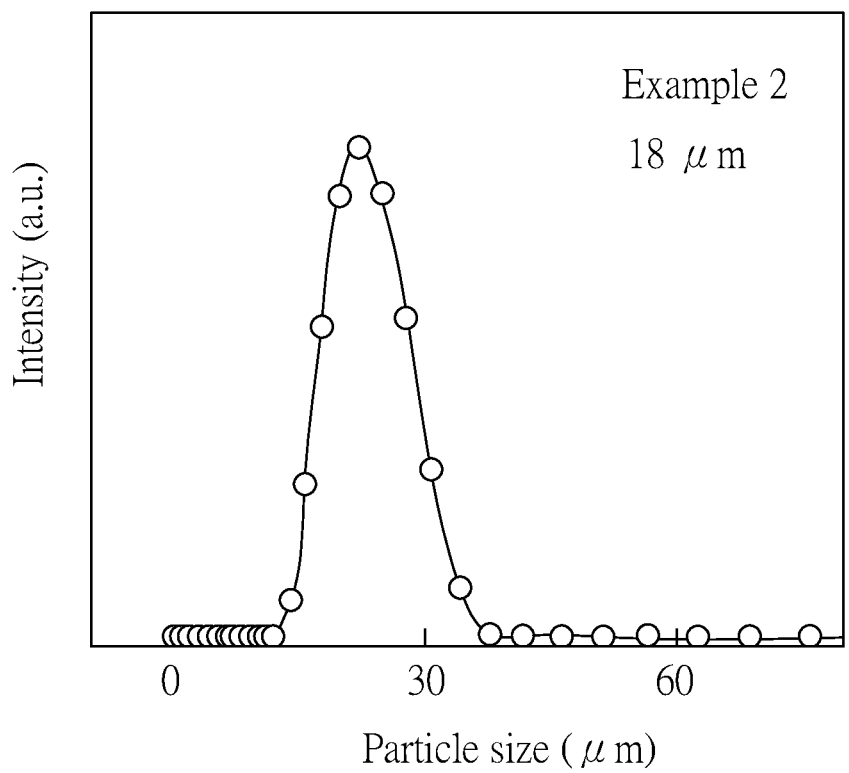
Figure 6:
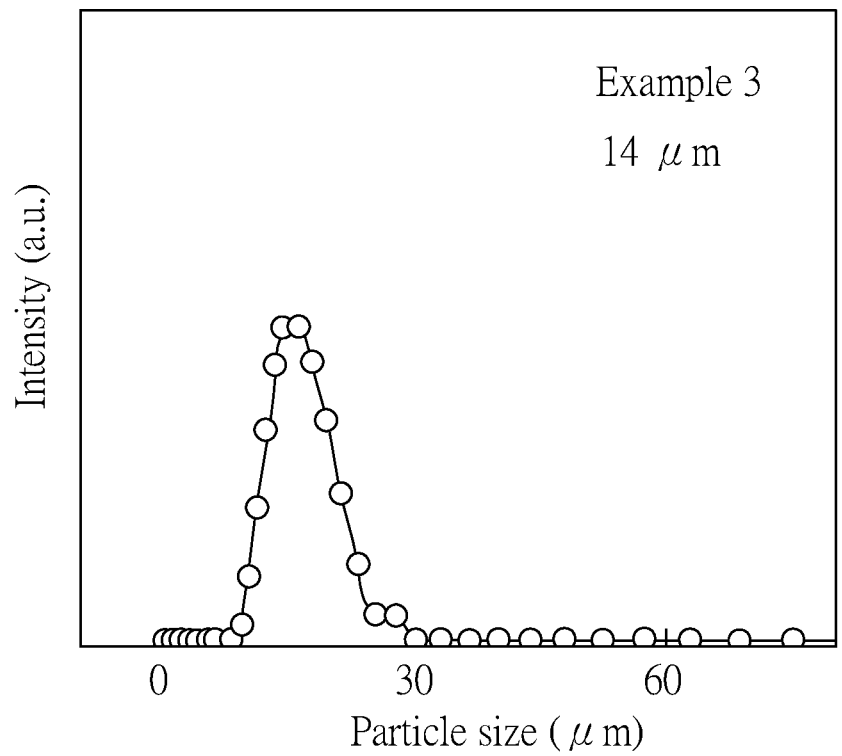
Figure 7:
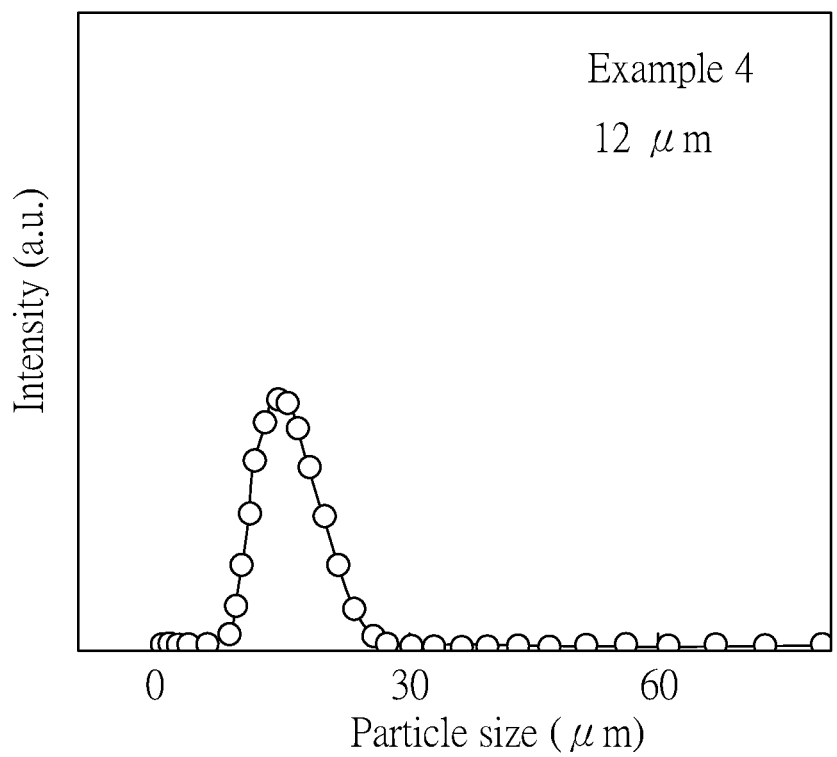
Figure 8:
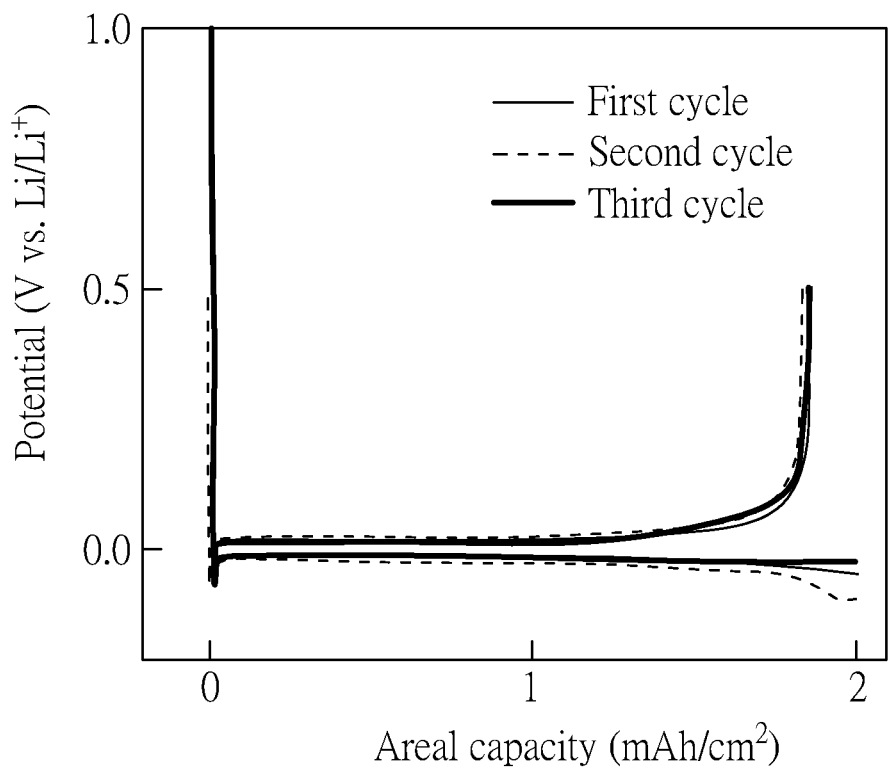
FIG. 8 to FIG. 11 show the charge/discharge diagram of the half-cell composed of the lithium metal electrode and the copper foil of Example 25 to Example 28 of the present invention at 0.2 mA/cm$^2$, respectively.
Figure 9:
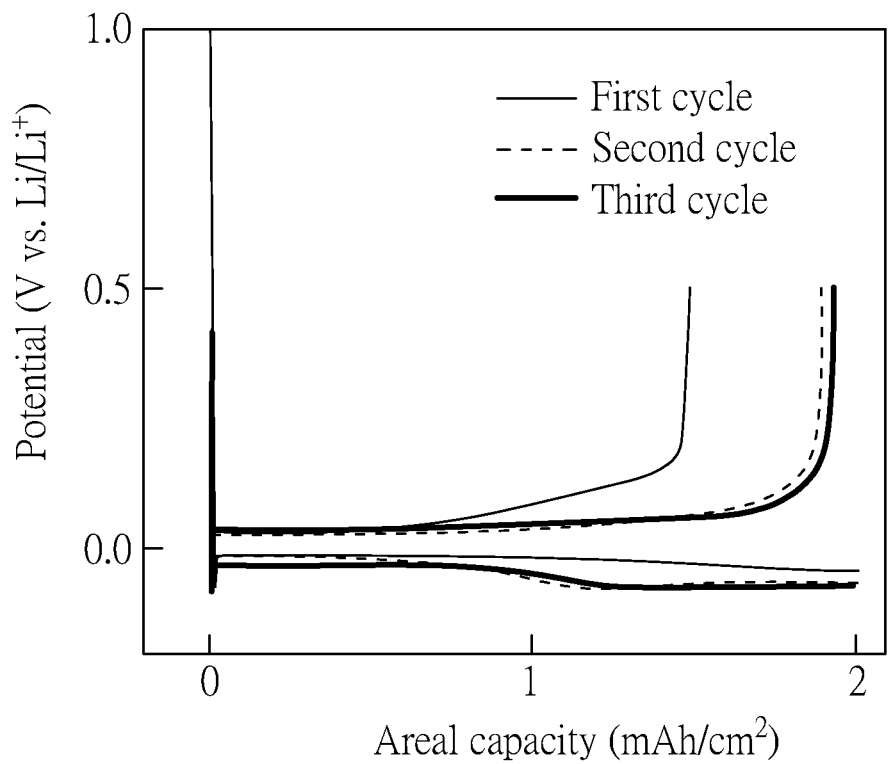
Figure 10:
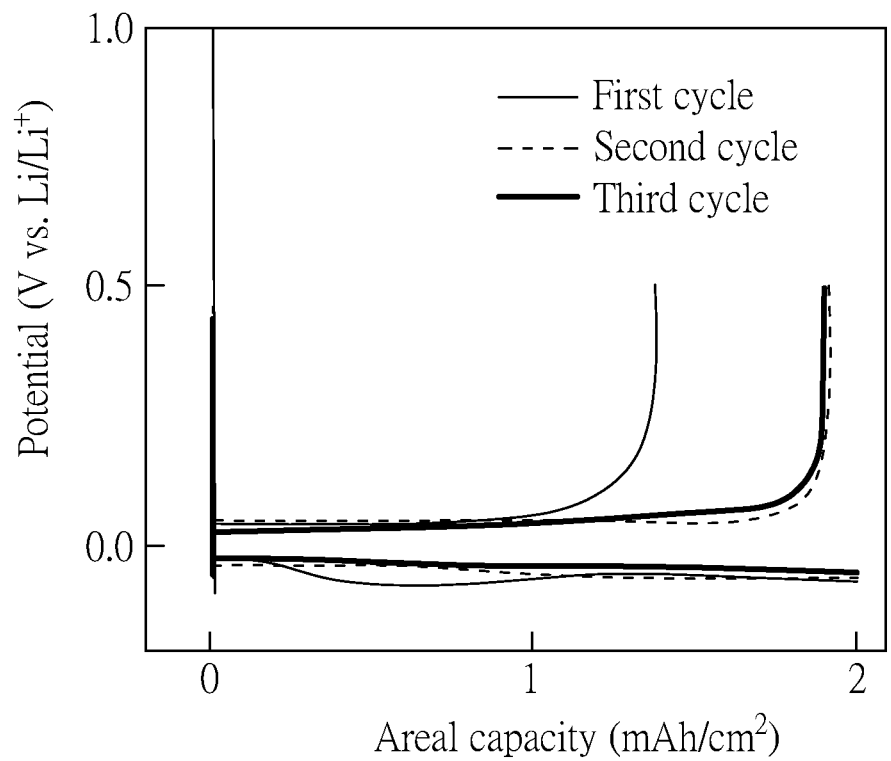
Figure 11:
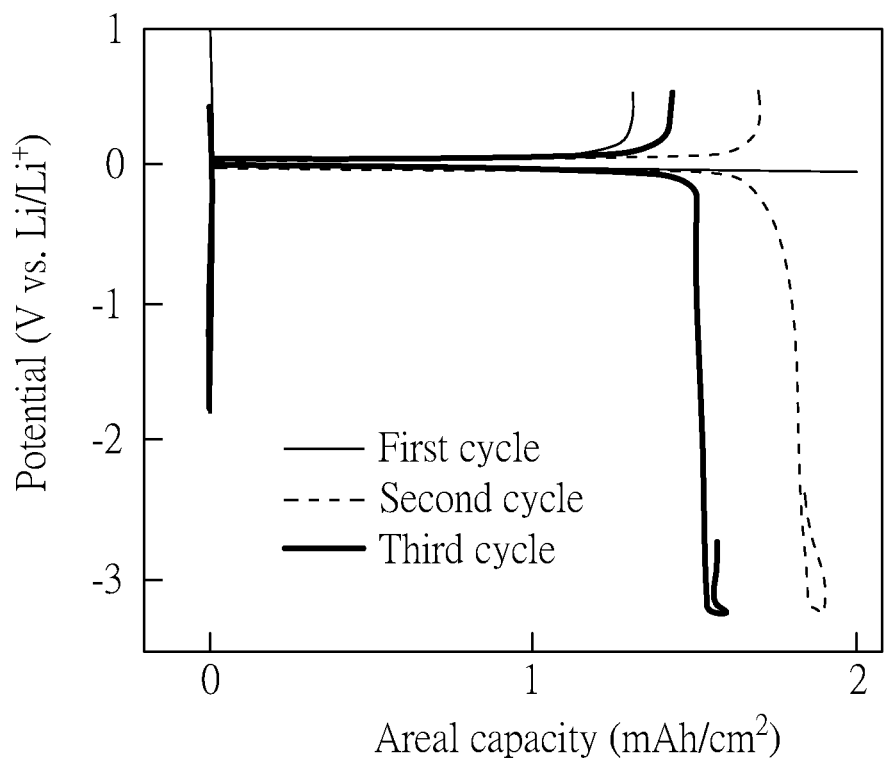

The XPS spectrum of the sulfide is shown in FIG. 1.
The XPS spectrum of the fluoride is shown in FIG. 2.
The XPS spectrum of the nitride is shown in FIG. 3.

On the other hand, the ultrasonication solution may comprise a metallic salt which may comprise lithium bis(trifluoromethanesulfonyl)imide (LiTFSI), lithium bis(fluorosulfonyl)imide (LiFSI), lithium hexafluorophosphate (LiPF$_6$), or a combination thereof. The aforementioned ultrasonication solution may comprise a solvent, and the solvent may comprise ethylene carbonate and diethyl carbonate; or, it may comprise ethylene carbonate and dimethoxy ethane. Moreover, the volume ratio of ethylene carbonate to diethyl carbonate in the aforementioned solvent is 1:1, or the volume ratio of ethylene carbonate to dimethoxy ethane in the aforementioned solvent is 1:1.

In an embodiment of the present invention, the mixed solution may be ultrasonically vibrated for an ultrasonication time, and the ultrasonication time is 1.5 hours, 3 hours, 6 hours or 12 hours, respectively. In an embodiment of the present invention, the mixed solution may be ultrasonically vibrated at an ultrasonication temperature, and the ultrasonication temperature is 10° C., 30° C., 50° C. or 60° C., respectively.

Preparation of Lithium Metal Powder

First, ethylene carbonate (EC) was heated to liquid state with 50° C., taken the required volume out, added with the equal volume of diethyl carbonate (DEC) or dimethoxy ethane (DME), stirred and mixed with a magnetic stirrer, and finally added with molecular sieves to remove water for 24 hours. In a glove box, 1 M lithium metallic salts (in the present embodiment, the lithium metallic salt was LiPF$_6$, LiFSI or LiTFSI, respectively) were respectively provided in two kinds of ultrasonication solutions having different solvent components (the volume ratio of EC/DEC was 1:1; or the volume ratio of EC/DME was 1:1), and stirred with a magnetic stirrer at room temperature for 24 hours.

Next, 3 mL of the ultrasonication solution was move into a 20 mL sample bottle. Then, 0.23 g of commercial lithium metal foil (about 200 μm) (i.e., the aforementioned lithium metal material) was weighted and cut into smaller pieces of lithium metal foil using an ordinary scissor, and put into the sample bottle to form a mixed solution. The sample bottle was sealed with parafilm to prevent the exposure to air after removal from the glove box. The steps above were all performed in an argon-filled glove box.

The previously prepared mixed solution was taken out from the glove box, and ultrasonically vibrated at different temperatures (10° C., 30° C., 50° C. or 60° C.) for different periods of time (1.5 hours, 3 hours, 6 hours or 12 hours) using high-power ultrasonic vibration machine, so that the lithium metal foil could be completely pulverized into lithium metal powder. The characteristic that lithium metal and electrolyte would react to form SEI was utilized here, and further sufficient vibration pulverized the lithium metal foil into smaller lithium metal powder and provided the reaction with sufficient energy to give a protective layer of artificial SEI. After the sufficient vibration, the lithium metal powder with the protective layer floated to the upper layer of the solution due to its low density, so that the mixed solution was obviously layered (upper layer: lithium powder; lower layer: shaking liquid). The lower layer solution obtained after the vibration was removed, the lithium metal powder was washed with dimethyl carbonate (DMC), and the washed lithium metal powder was placed in 3 mL of dimethyl carbonate to obtain a suspension having lithium metal powder. Since dimethyl carbonate is volatile, it is considered a good cleaning solvent.

Preparation of Lithium Metal Electrode

Since the lithium metal powder was unable to be directly shaped alone, there was a need to use a copper foil as a substrate. A copper foil (8 μm) was used as a substrate, a uniform solution containing lithium powder was sucked up using a pipette, then dropped on to the copper foil substrate, and the substrate was put in a vacuum oven for 12 hours to completely volatilize the DMC solution to obtain a lithium metal electrode. However, the lithium metal electrode obtained after this procedure was not smooth, and thus a pressing procedure was needed to make the electrode denser. A commercial three-layered separator membrane (PE/PP/PE) was used as a separator membrane to prevent electrodes from sticking to the pressing tool during pressing. After pressing, the thickness of the lithium metal electrode could be reduced from the initial 140 μm to about 80 μm. The above operations were all performed in the glove box.

Preparation of the Ultra-Thin Lithium Metal Electrode

The aforementioned lithium metal powder suspension was sucked up and dropped on the cleaned copper substrate, the slurry (i.e., lithium metal powder suspension) was pasted evenly using a scraper with the thickness of 50 μm, and put into a vacuum oven in the glove box for 12 hours to completely volatilize the DMC. The thickness of the pasted substrate was reduced by rolling with a rolling machine, and the thickness could be less than 20 μm; and, it was then cut into a circular electrode sheet with a diameter of 1.3 cm for electrical testing.

Assembly of Lithium Batteries Containing Lithium Metal Electrodes

CR2032 was used as a battery shell component, and glass fiber was used as a separator membrane. The assembly steps were as follows: placing the copper foil in the center of the bottom cover of the battery shell; placing the separator membrane on the copper foil, dropping about 75 μL of electrolyte (1 M LiTFSI/EC:DME (volume ratio 1:1)+5 wt % LiNO$_3$+0.5 wt % fluorinated ethylene carbonate (FEC)) to wet the separator membrane; placing the aforementioned lithium metal electrode, a spring sheet and an upper cover in sequence; and, finally using a packaging machine to press them several times to ensure the tightness to obtain a Lithium/copper half-cell having lithium metal electrodes.

Preparation of Silicon Carbon Negative Electrode

Silicon carbon active material, carbon black (CB) and adhesive of sodium polyacrylate (Na-PAA) were provided in a weight ratio of 88:1:11 and mixed evenly, added with an appropriate amount of deionized water (DI-water) as a solvent, and mixed well until no particles were visible in the slurry. The slurry was uniformly pasted on the cleaned copper substrate using a scraper with a thickness of 150 μm. After drying at 90° C. for 8 hours in a vacuum oven, it was naturally cooled to room temperature, and finally cut into circular silicon carbon electrodes with a diameter of 1.3 cm (i.e., working electrode).

The ternary lithium-nickel cobalt manganese oxide material ($LiNi_{0.6}Mn_{0.2}Co_{0.2}O_2$, NMC-622), carbon black (Super P) and adhesive of polyvinylidene difluoride (PVDF) were provided in a weight ratio of 7:2:1 in a sample bottle, added with an appropriate amount of N-methylpyrrolidone (NMP) as a solvent, and stirred with a magnetic stirrer for two hours. The slurry was uniformly coated on the cleaned aluminum substrate using a scrapper with a thickness of 250 μm. After drying at 90° C. for 8 hours in a vacuum oven, it was naturally cooled to room temperature, and finally cut into circular NMC-622 electrode with a diameter of 1.3 cm.

Preparation of Pre-Lithiated Electrode

In order to form a pre-lithiated electrode, a commercial three-layered separator membrane (PE/PP/PE) was used as a separator to prevent the electrode from sticking to the pressing tool during pressing after the lithium metal powder suspension was sucked up, dropped on the silicon carbon negative electrode and put in a vacuum oven for 8 hours in a glove box.

Assembly of Lithium Batteries Containing Pre-Lithiated Electrodes

CR2032 was used as a battery shell component, and glass fiber was used as a separator membrane. The assembly steps were as follows: placing the aforementioned silicon carbon electrode in the center of the bottom cover of the battery shell; placing the separator membrane on the silicon carbon electrode, dropping about 75 μL of electrolyte (1 M $LiPF_6$/ EC:DEC (volume ratio 1:1)+10 wt % FEC) to wet the separator membrane; placing the aforementioned pre-lithiated electrode, a spring sheet and an upper cover in sequence; and finally using a packaging machine to press them several times to ensure the tightness to obtain a lithium battery containing the pre-lithiated electrode.

Example 1

The preparation of the lithium metal powder of the present embodiment was as described above, wherein the metallic salt contained in the ultrasonication solution of the present embodiment was $LiPF_6$, and the solvent of the ultrasonication solution was EC and DEC (volume ratio was 1:1). The ultrasonication time was 1.5 hours, and the ultrasonication temperature was 30° C.

Example 2

The present embodiment was similar to Example 1, except that the ultrasonication time of the present embodiment was 3 hours.

Example 3

The present embodiment was similar to Example 1, except that the ultrasonication time of the present embodiment was 6 hours.

Example 4

The present embodiment was similar to Example 1, except that the ultrasonication time of the present embodiment was 12 hours.

Example 5

The present embodiment was similar to Example 2, except that the solvent of the ultrasonication solution in the present embodiment was EC and DME (volume ratio is 1:1), and the ultrasonication temperature was 10° C.

Example 6

The present embodiment was similar to Example 5, except that the ultrasonication temperature of the present embodiment is 30° C.

Example 7

The present embodiment was similar to Example 5, except that the ultrasonication temperature of the present embodiment was 50° C.

Example 8

The present embodiment was similar to Example 5, except that the ultrasonication temperature of the present embodiment was 60° C.

Example 9

The present embodiment was similar to Example 1, except that the metallic salts contained in the ultrasonication solution of the present embodiment was LiFSI.

Example 10

The present embodiment was similar to Example 9, except that the ultrasonication time of the present embodiment was 3 hours.

Example 11

The present embodiment was similar to Example 9, except that the ultrasonication time of the present embodiment was 6 hours.

Example 12

The present embodiment was similar to Example 9, except that the ultrasonication time of the present embodiment was 12 hours.

Example 13

The present embodiment was similar to Example 10, except that the solvent of the ultrasonication solution in the present embodiment was EC and DME (volume ratio was 1:1), and the ultrasonication temperature was 10° C.

Example 14

The present embodiment was similar to Example 13, except that the ultrasonication temperature of the present embodiment was 30° C.

Example 15

The present embodiment was similar to Example 13, except that the ultrasonication temperature of the present embodiment was 50° C.

Example 16

The present embodiment was similar to Example 13, except that the ultrasonication temperature of the present embodiment was 60° C.

Example 17

The present embodiment was similar to Example 1, except that the metallic salt contained in the ultrasonication solution of the present embodiment was LiTFSI.

Example 18

The present embodiment was similar to Example 17, except that the ultrasonication time of the present embodiment was 3 hours.

Example 19

The present embodiment was similar to Example 17, except that the ultrasonication time of the present embodiment was 6 hours.

Example 20

The present embodiment was similar to Example 17, except that the ultrasonication time of the present embodiment was 12 hours.

Example 21

The present embodiment was similar to Example 18, except that the solvent of the ultrasonication solution in the present embodiment was EC and DME (volume ratio was 1:1), and the ultrasonication temperature was 10° C.

Example 22

The present embodiment was similar to Example 21, except that the ultrasonication temperature of the present embodiment was 30° C.

Example 23

The present embodiment was similar to Example 21, except that the ultrasonication temperature of the present embodiment was 50° C.

Example 24

The present embodiment was similar to Example 21, except that the ultrasonication temperature of the present embodiment is 60° C.

Example 25

In the present embodiment, the lithium metal electrode obtained by pressing the lithium metal powder of Example 1 was used as a negative electrode. The thickness of the lithium metal negative electrode prepared in the present embodiment was about 80 μm. The preparations for the lithium metal electrode and the lithium battery comprising the same according to the present embodiment was as described above.

Example 26

The present embodiment was similar to Example 25, except that the lithium metal electrode obtained by pressing the lithium metal powder of Example 2 was used as a negative electrode in the present embodiment. The thickness of the lithium metal negative electrode prepared in the present embodiment was about 80 μm.

Example 27

The present embodiment was similar to Example 25, except that the lithium metal electrode obtained by pressing the lithium metal powder of Example 3 was used as a negative electrode in the present embodiment. The thickness of the lithium metal negative electrode prepared in the present embodiment was about 80 μm.

Example 28

The present embodiment was similar to Example 25, except that the lithium metal electrode obtained by pressing the lithium metal powder of Example 4 was used as a negative electrode in the present embodiment. The thickness of the lithium metal negative electrode prepared in the present embodiment was about 80 μm.

Example 29

The present embodiment was similar to Example 25, except that the lithium metal electrode obtained by pressing the lithium metal powder of Example 5 was used as a negative electrode in the present embodiment. The thickness of the lithium metal negative electrode prepared in the present embodiment was about 80 μm.

Example 30

The present embodiment was similar to Example 25, except that the lithium metal electrode obtained by pressing the lithium metal powder of Example 6 was used as a negative electrode in the present embodiment. The thickness of the lithium metal negative electrode prepared in the present embodiment was about 80 μm.

Example 31

The present embodiment was similar to Example 25, except that the lithium metal electrode obtained by pressing the lithium metal powder of Example 7 was used as a negative electrode in the present embodiment. The thickness of the lithium metal negative electrode prepared in the present embodiment was about 80 μm.

Example 32

The present embodiment was similar to Example 25, except that the lithium metal electrode obtained by pressing the lithium metal powder of Example 8 was used as a negative electrode in the present embodiment. The thickness of the lithium metal negative electrode prepared in the present embodiment was about 80 μm.

Example 33

The present embodiment was similar to Example 25, except that the lithium metal electrode obtained by pressing the lithium metal powder of Example 9 was used as a negative electrode in the present embodiment. The thickness of the lithium metal negative electrode prepared in the present embodiment was about 80 μm.

Example 34

The present embodiment was similar to Example 25, except that the lithium metal electrode obtained by pressing the lithium metal powder of Example 10 was used as a negative electrode in the present embodiment. The thickness of the lithium metal negative electrode prepared in the present embodiment was about 80 μm.

Example 35

The present embodiment was similar to Example 25, except that the lithium metal electrode obtained by pressing the lithium metal powder of Example 11 was used as a negative electrode in the present embodiment. The thickness of the lithium metal negative electrode prepared in the present embodiment was about 80 μm.

Example 36

The present embodiment was similar to Example 25, except that the lithium metal electrode obtained by pressing the lithium metal powder of Example 12 was used as a negative electrode in the present embodiment. The thickness of the lithium metal negative electrode prepared in the present embodiment was about 80 μm.

Example 37

The present embodiment was similar to Example 25, except that the lithium metal electrode obtained by pressing the lithium metal powder of Example 13 was used as a negative electrode in the present embodiment. The thickness of the lithium metal negative electrode prepared in the present embodiment was about 80 μm.

Example 38

The present embodiment was similar to Example 25, except that the lithium metal electrode obtained by pressing the lithium metal powder of Example 14 was used as a negative electrode in the present embodiment. The thickness of the lithium metal negative electrode prepared in the present embodiment was about 80 μm.

Example 39

The present embodiment was similar to Example 25, except that the lithium metal electrode obtained by pressing the lithium metal powder of Example 15 was used as a negative electrode in the present embodiment. The thickness of the lithium metal negative electrode prepared in the present embodiment was about 80 μm.

Example 40

The present embodiment was similar to Example 25, except that the present embodiment used the lithium metal electrode obtained by pressing the lithium metal powder of Example 16 was used as a negative electrode in the present embodiment. The thickness of the lithium metal negative electrode prepared in the present embodiment was about 80 μm.

Example 41

The present embodiment was similar to Example 25, except that the lithium metal electrode obtained by pressing the lithium metal powder of Example 17 was used as a negative electrode in the present embodiment. The thickness of the lithium metal negative electrode prepared in the present embodiment was about 80 μm.

Example 42

The present embodiment was similar to Example 25, except that the lithium metal electrode obtained by pressing the lithium metal powder of Example 18 was used as a negative electrode in the present embodiment. The thickness of the lithium metal negative electrode prepared in the present embodiment was about 80 μm.

Example 43

The present embodiment was similar to Example 25, except that the lithium metal electrode obtained by pressing the lithium metal powder of Example 19 was used as a negative electrode in the present embodiment. The thickness of the lithium metal negative electrode prepared in the present embodiment was about 80 μm.

Example 44

The present embodiment was similar to Example 25, except that the lithium metal electrode obtained by pressing the lithium metal powder of Example 20 was used as a negative electrode in the present embodiment. The thickness of the lithium metal negative electrode prepared in the present embodiment was about 80 μm.

Example 45

The present embodiment was similar to Example 25, except that the lithium metal electrode obtained by pressing the lithium metal powder of Example 21 was as a negative electrode in the present embodiment. The thickness of the lithium metal negative electrode prepared in the present embodiment was about 80 μm.

Example 46

The present embodiment was similar to Example 25, except that the lithium metal electrode obtained by pressing the lithium metal powder of Example 22 was used as a negative electrode in the present embodiment. The thickness of the lithium metal negative electrode prepared in the present embodiment was about 80 μm.

Example 47

The present embodiment was similar to Example 25, except that the lithium metal electrode obtained by pressing the lithium metal powder of Example 23 was used as a negative electrode in the present embodiment. The thickness of the lithium metal negative electrode prepared in the present embodiment was about 80 μm.

Example 48

The present embodiment was similar to Example 25, except that the lithium metal electrode obtained by pressing the lithium metal powder of Example 24 was used as a negative electrode in the present embodiment. The thickness of the lithium metal negative electrode prepared in the present embodiment was about 80 μm.

Example 49

The lithium metal powder of Example 23 was used in the present embodiment. A lithium metal electrode was prepared by rolling with a rolling machine according to the aforementioned preparation of an ultra-thin lithium metal electrode. The thickness of the lithium metal electrode prepared in the present embodiment was 20 μm.

Example 50

The lithium metal powder of Example 2 was used to pre-lithiate the silicon carbon negative electrode in the present embodiment. The pre-lithiation process was the process as described above, and the preparation of the lithium battery comprising the pre-lithiated electrode of the present embodiment was the preparation as described above.

Example 51

The lithium metal powder of Example 23 was used to pre-lithiate the silicon carbon negative electrode in the present embodiment. The pre-lithiation process was the process as described above, and the preparation of the lithium battery comprising the pre-lithiated electrode of the present embodiment was the preparation as described above.

Comparative Example 1

In Comparative Example 1, a commercial lithium metal foil (about 200 μm in thickness) was used as an electrode.

Comparative Example 2

The preparation of Comparative Example 2 was the same as that of Example 50, except that Comparative Example 2 used a silicon carbon negative electrode without pre-lithiation.

Efficiency

FIG. 4 to FIG. 7 showed distribution diagrams of particle size of lithium metal powders according to Example 1 to Example 4 of the present invention, respectively.

As shown in FIG. 4 to FIG. 7, it was found that the lithium metal powder prepared by Example 1 had a relatively large particle size of about 64 μm; the particle size of the lithium metal powder in Example 2 was 18 μm; the particle sizes of the lithium metal powder obtained in Example 3 and Example 4 were 14 μm and 12 μm, respectively.

FIG. 8 to FIG. 11 showed the charge/discharge diagram of the lithium metal electrode of Example 25 to Example 28 of the present invention at 0.2 mA/cm², respectively.

As shown in FIG. 8 to FIG. 11 and Table 1, it could be clearly found from the first-cycle Coulombic efficiency that the first-cycle Coulombic efficiency decreased with the increase of the ultrasonication time. The Coulomb efficiency of the first-circle of Example 25 is 91.7%; the first-cycle Coulombic efficiency of Example 26 was 74.6%; the first-cycle Coulombic efficiency of Example 27 was 71.1%; and the first-cycle Coulombic efficiency of Example 28 was 65.7%.

TABLE 1

| | Example 25 C.E. (%) | Example 26 C.E. (%) | Example 27 C.E. (%) | Example 28 C.E. (%) |
|---|---|---|---|---|
| First cycle | 91.7 | 74.6 | 71.1 | 65.7 |
| Second cycle | 92.2 | 91.6 | 90.1 | 89.4 |
| Third cycle | 92.9 | 92.2 | 92.2 | 89.6 |

Figure 12:
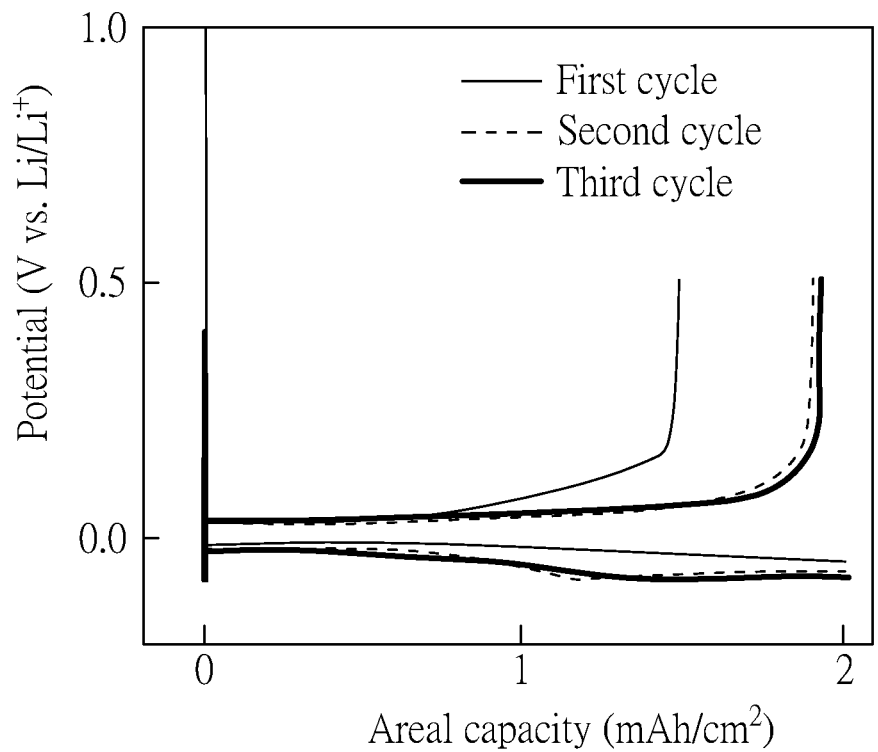
FIG. 12 to FIG. 14 show the charge/discharge diagram of the half-cell composed of the lithium metal electrode and the copper foil of Example 26, Example 34 and Example 42 of the present invention at 0.2 mA/cm$^2$, respectively.
Figure 13:
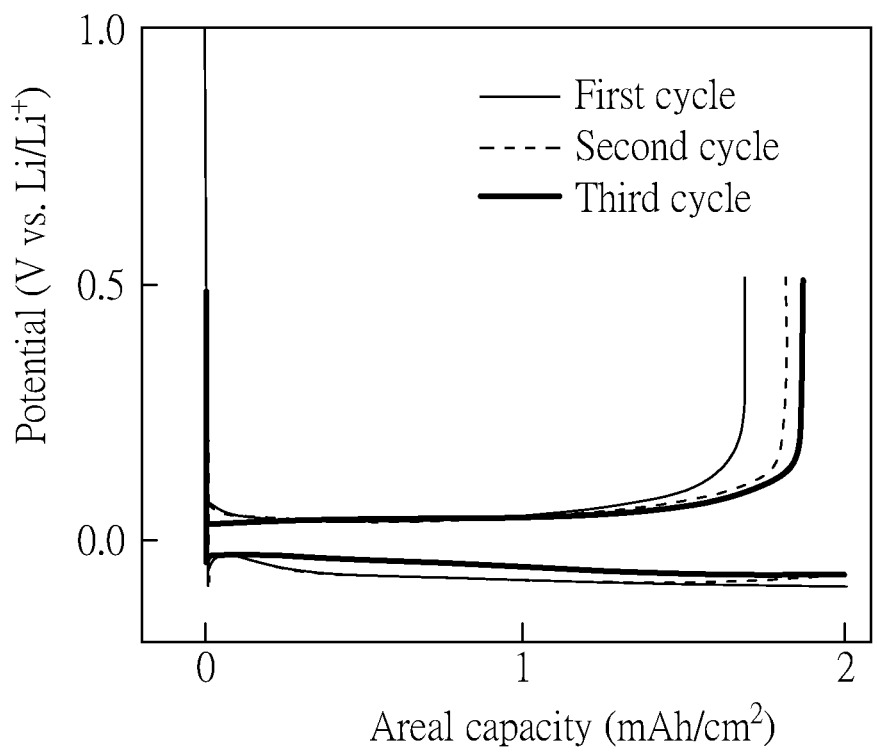
Figure 14:
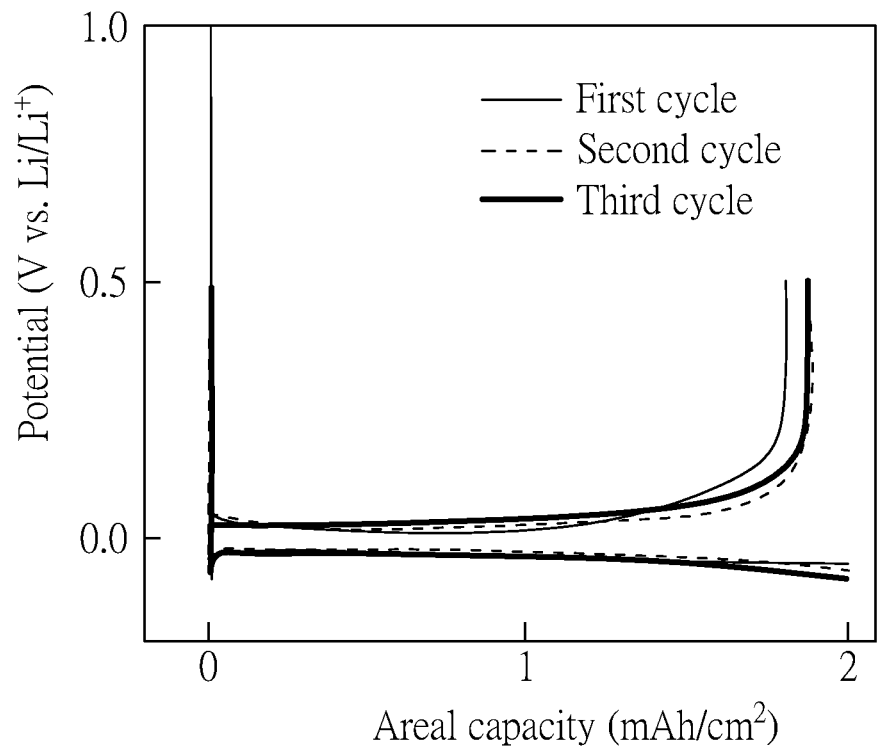

FIG. 12 to FIG. 14 showed the charge/discharge diagram of the lithium metal electrode of Example 26, Example 34 and Example 42 of the present invention at 0.2 mA/cm², respectively.

As shown in FIG. 12 to FIG. 14 and Table 2, three different kinds of lithium salts (LiPF$_6$, LiFSI, LiTFSI) with the solvent (EC/DEC volume ratio=1:1) were used to perform different modifications of the ultrasonication solutions, and the ultrasonication solutions were ultrasonically vibrated for 3 hours. As to the performance at the lowest speed, it could be found that the lithium metal electrodes prepared by Example 34 and Example 42 had the improved performance in the first-cycle Coulombic efficiency, the first-cycle Coulombic efficiency of Example 26 was 74.6%, the first-cycle Coulombic efficiency of Example 34 was 84.8%, and the first-cycle Coulombic efficiency of Example 42 was 90.5%, indicating that the artificial SEI protective layers formed by the reaction of different lithium metallic salts in the process of ultrasonic vibration had different properties.

TABLE 2

| | Example 26 C.E. (%) | Example 34 C.E. (%) | Example 42 C.E. (%) |
|---|---|---|---|
| First cycle | 74.6 | 84.8 | 90.5 |
| Second cycle | 91.6 | 91.8 | 93.6 |
| Third cycle | 92.2 | 93.5 | 93.8 |

Figure 15:
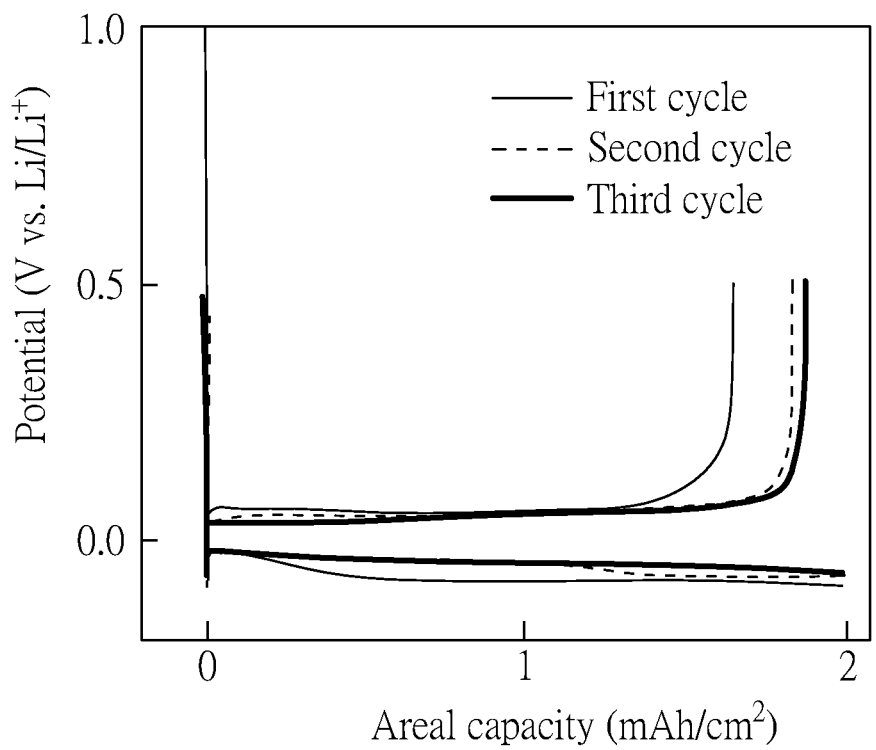
FIG. 15 to FIG. 17 show the charge/discharge diagram of the half-cell composed of the lithium metal electrode and the copper foil of Example 30, Example 38 and Example 46 of the present invention at 0.2 mA/cm$^2$, respectively.
Figure 16:
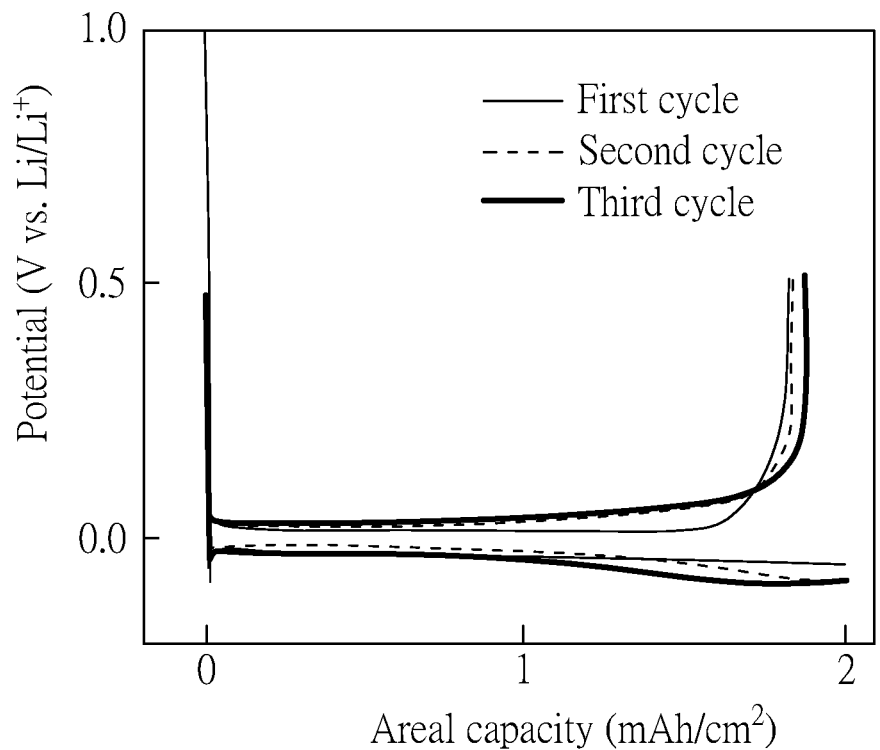
Figure 17:
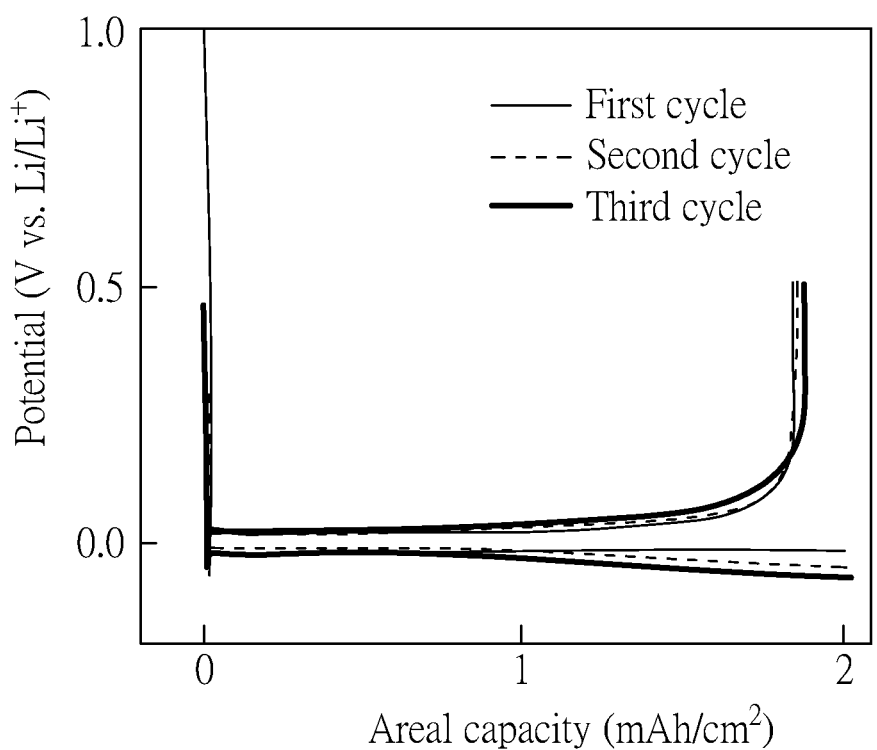
Figure 18:
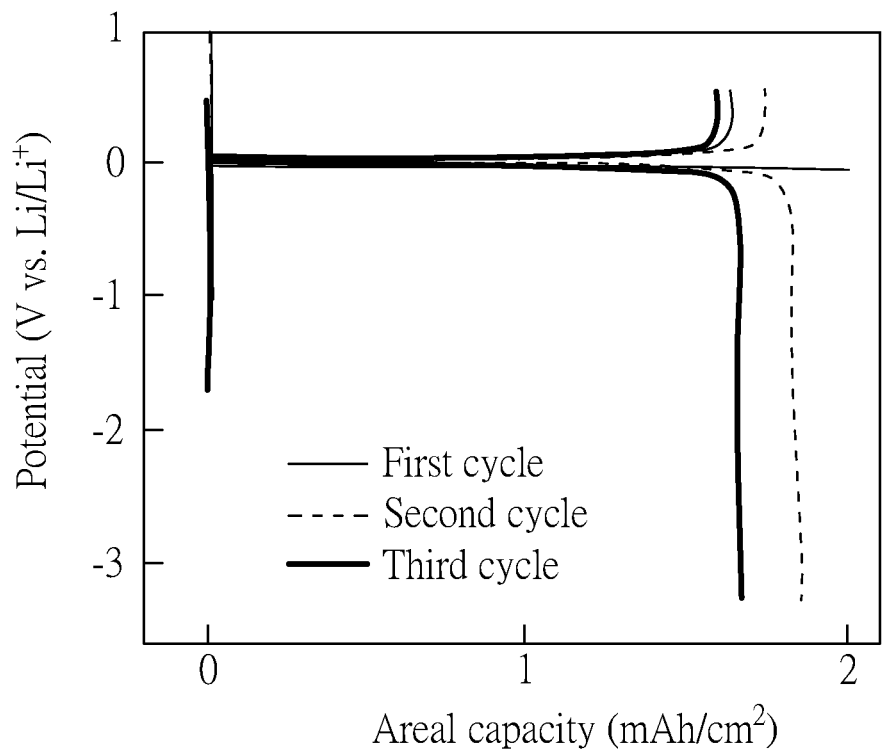
FIG. 18 to FIG. 21 show the charge/discharge diagram of the half-cell composed of the lithium metal electrode and the copper foil of Example 45 to Example 48 of the present invention at 0.2 mA/cm$^2$, respectively.
Figure 19:
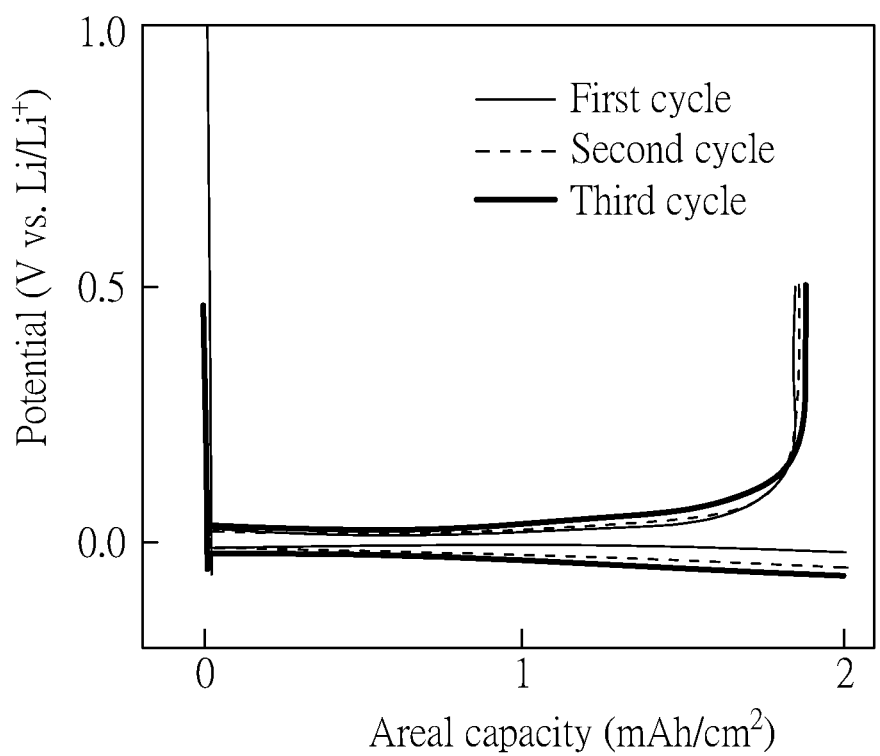
Figure 20:
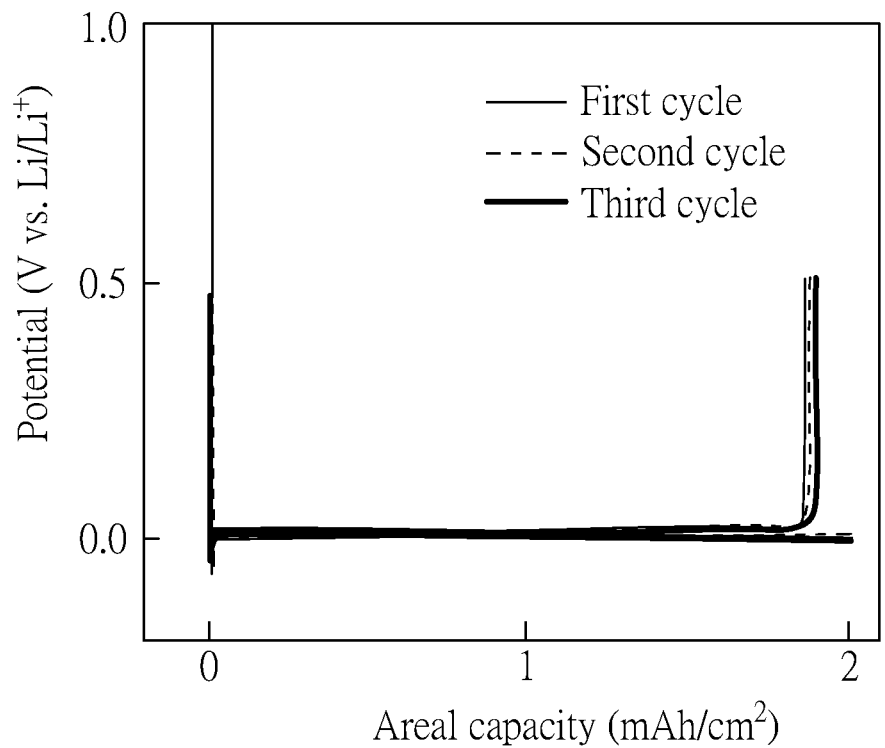
Figure 21:
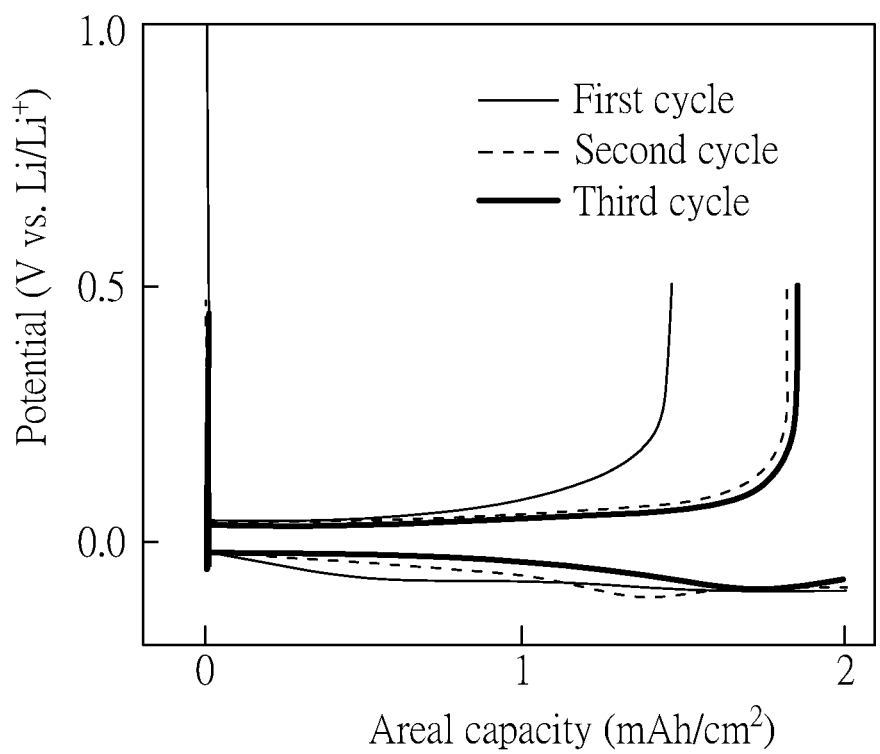

FIG. 15 to FIG. 17 showed the charge/discharge diagram of the lithium metal electrode of Example 30, Example 38 and Example 46 of the present invention at 0.2 mA/cm², respectively.

As shown in FIG. 15 to FIG. 17 and Table 3, ether-based solvents being relatively easy to form a stable SEI protective layer with the lithium metal were provided. As to the performance at the lowest speed, it could be found that all the first-cycle Coulombic efficiency for the replacement of ether-based solvent were increased: Example 30 increased to 82.5% compared with 74.6% in Example 26; Example 38 increased to 90.7% compared with Example 34; and Example 46 increased to 92.5% compared with Example 42.

TABLE 3

| | Example 30 C.E. (%) | Example 38 C.E. (%) | Example 46 C.E. (%) |
|---|---|---|---|
| First cycle | 82.5 | 90.7 | 92.5 |
| Second cycle | 91.5 | 91.8 | 92.7 |
| Third cycle | 92.5 | 93.6 | 93.7 |

FIG. 18 to FIG. 21 showed the charge/discharge diagram of the lithium metal electrode of Example 45 to Example 48 of the present invention at 0.2 mA/cm², respectively.

As shown in FIG. 18 to FIG. 21 and Table 4, the temperature during ultrasonic vibration was controlled to further improve the electrical properties and the content of active lithium. The first-cycle Coulombic efficiency of Example 45 was 81.3%. The first-cycle Coulombic efficiency of Example 47 at low speed was 93.1%, which not only made a breakthrough in first-cycle Coulombic efficiency, but also had high stability in the second- and third-cycle Coulombic efficiency (94.0% and 94.8%, respectively). The first-cycle Coulombic efficiency of Example 48 at low speed was 72.3%, and its following Coulombic efficiency was 91.1% and 92.3%, respectively. This was because that the ultrasonication solution was a mixture of ethers (DME) and carbonates (EC), wherein the boiling point of DME was 83° C., parts of DME had volatilized and existed in a gaseous state in a ultrasonic container during the process of ultrasonic vibration, resulting in the artificial SEI protective layer generated by the reaction was not as expected. Accordingly, it could be seen that high temperature would affect the electrical properties, whereas excessively low temperature would also affect the electrical properties of the lithium metal powder electrode.

TABLE 4

|  | Example 45 C.E. (%) | Example 46 C.E. (%) | Example 47 C.E. (%) | Example 48 C.E. (%) |
| --- | --- | --- | --- | --- |
| First cycle | 81.3 | 92.5 | 93.1 | 72.3 |
| Second cycle | 93.7 | 92.7 | 94.0 | 91.1 |
| Third cycle | 95.0 | 93.7 | 94.8 | 92.3 |

Figure 22:
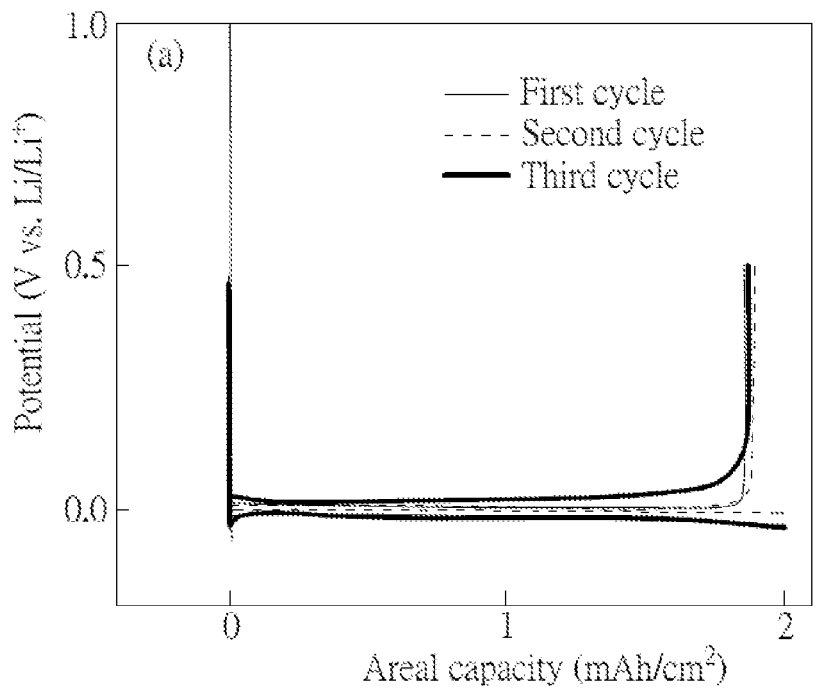
FIG. 22 to FIG. 24 show the charge/discharge diagram of the half-cell composed of the lithium metal electrode and the copper foil of the Comparative Example 1, Example 47 and Example 49 of the present invention at 0.2 mA/cm$^2$, respectively.
Figure 23:
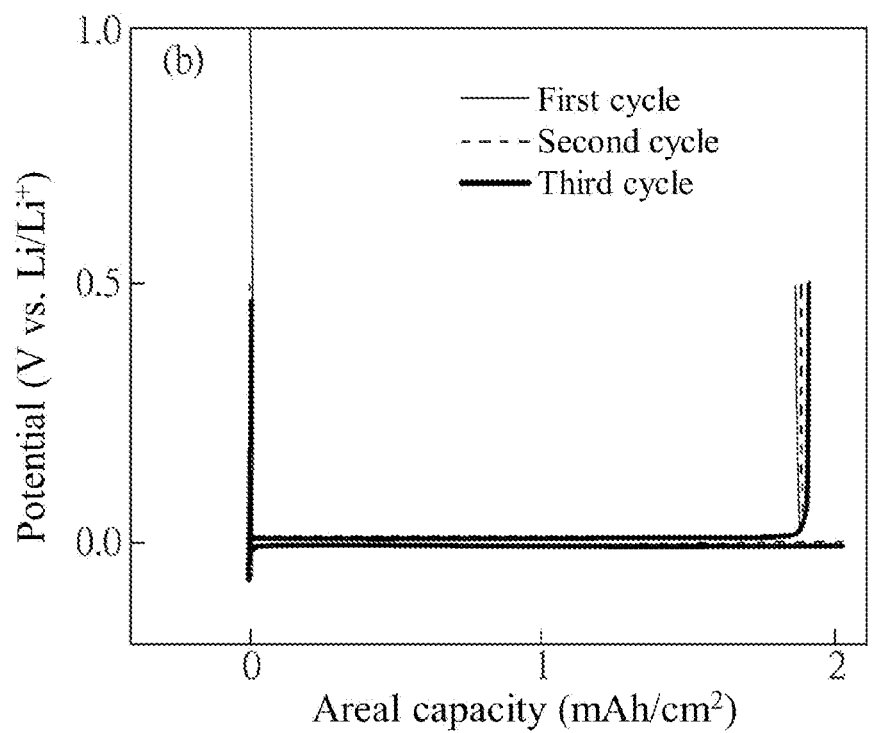
Figure 24:
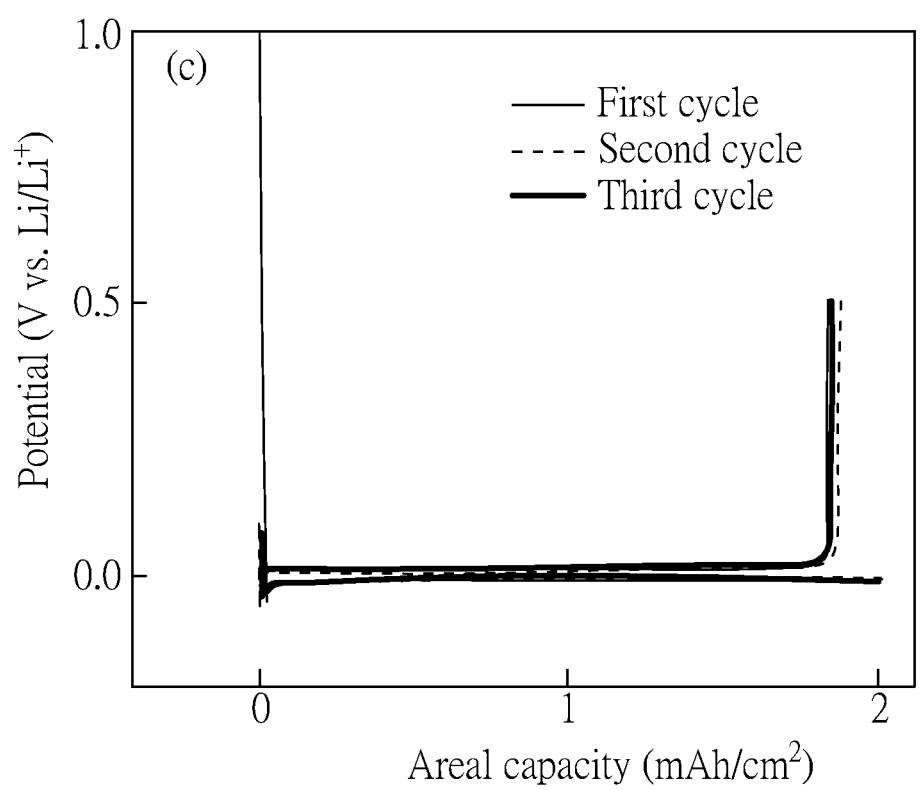

FIG. 22 to FIG. 24 showed the charge/discharge diagram of a lithium-copper half-cell of the lithium metal electrode of Comparative Example 1, Example 47 and Example 49 of the present invention at 0.2 mA/cm², respectively.

Example 49 had relatively stable charge/discharge curves, and had relatively small potential difference during charge and discharge.

TABLE 5

|  | Comparative Example 1 C.E. (%) | Example 47 C.E. (%) | Example 49 C.E. (%) |
| --- | --- | --- | --- |
| First cycle | 93.0 | 93.1 | 93.4 |
| Second cycle | 93.2 | 94.0 | 94.5 |
| Third cycle | 93.2 | 94.8 | 95.4 |

Further, Comparative Example 1, Example 47 and Example 49 were made into lithium batteries comprising lithium metal electrodes, the positive electrodes were NMC-622 electrodes, and the preparations were as described above. As shown in Table 6, it could be seen that the lithium battery of Comparative Example 1 had a capacity of 66 mAh/g at 1500 mA/g.

On the contrary, the lithium batteries of Example 47 and Example 49 respectively had higher capacities of 114 mAh/g and 130 mAh/g at high speed (1500 mA/g), and the Coulombic efficiencies were 99.2% and 99.5%, which were significantly higher than that of the lithium battery of Comparative Example 1, which was 96.8%. In addition, the high-speed capacity retention rates of the lithium batteries of Example 47 and Example 49 respectively were 72% and 78%, which were significantly higher than that of the lithium battery of Comparative Example 1, which was 42%.

TABLE 6

|  | Lithium battery of Comparative Example 1 | | Lithium battery of Example 47 | | Lithium battery of Example 49 | |
| --- | --- | --- | --- | --- | --- | --- |
| Speed | Discharge/ Charge (mAh/g) | C.E. (%) | Discharge/ Charge (mAh/g) | C.E. (%) | Discharge/ Charge (mAh/g) | C.E. (%) |
| 25 | 156/161 | 96.7 | 159/167 | 95.8 | 167/175 | 95.4 |
| 75 | 147/151 | 97.6 | 154/157 | 97.9 | 162/166 | 98.0 |
| 150 | 139/141 | 98.2 | 149/151 | 98.5 | 157/160 | 98.6 |
| 300 | 126/128 | 98.3 | 142/144 | 98.9 | 152/153 | 98.9 |
| 500 | 112/113 | 98.8 | 137/138 | 99.1 | 146/148 | 99.2 |
| 1500 | 66/68 | 96.8 | 114/115 | 99.2 | 130/131 | 99.5 |
| High-speed capacity retention rate (%) | 42 | | 72 | | 78 | |

Coulomb efficiency (C.E. %): Discharge/charge capacity * 100%
Speed and discharge capacity and charge capacity [=] mAh/g
High-speed retention rates: Discharge capacity of 1500 mA/g/25 mA/g * 100%

As shown in FIG. 22 to FIG. 24 and Table 5, it could be seen that the first-cycle Coulombic efficiency of Comparative Example 1 using commercial lithium metal foil was 93.0% at low speed (0.2 mA/cm²); the first-cycle Coulombic efficiency of Example 47 and Example 49 respectively was 93.1% and 93.4%, surpassing the Coulomb efficiency of Comparative Example 1, but the thickness respectively was 80 μm and 20 μm only; and, it had excellent performance in the first-cycle Coulomb efficiency, and it had second-cycle Coulomb efficiency (94.0% and 94.8%, respectively) and third-cycle Coulomb efficiency (94.5% and 95.4%, respectively), which were better that that of Comparative Example 1. In addition, it could also be found that Example 47 and Furthermore, as to the 200-cycle cycle stability, the capacity retention rate of the lithium battery of Comparative Example 1 was 45.2%, and the lithium batteries of Example 47 and Example 49 were 63.3% and 65.2%, respectively.

As shown in Table 7, the silicon carbon negative electrode and commercial lithium metal foil were used to form a half-cell for testing. It could be found that the first-cycle Coulombic efficiency of Comparative Example 2 was 72.2% only, the first-cycle Coulomb efficiency of Example 50 significantly increased to 93.9%, and the capacity also increased. Example 51 was completely lithiated, so that it discharged without charging, and there was no charge capacity.

TABLE 7

| Speed | Comparative Example 2 | | Example 50 | | Example 51 | |
|---|---|---|---|---|---|---|
| | Discharge/Charge (mAh/g) | C.E. (%) | Discharge/Charge (mAh/g) | C.E. (%) | Discharge/Charge (mAh/g) | C.E. (%) |
| 0.1 C-1 | 900/1246 | 72.2 | 958/1020 | 93.9 | 1149/0.5 | 204026 |
| 0.1 C-2 | 916/968 | 94.6 | 967/1016 | 95.1 | 1000/1020 | 98.9 |
| 0.1 C-3 | 911/947 | 96.1 | 964/999 | 96.5 | 985/1003 | 98.2 |

Coulomb efficiency (C.E. %): Discharge/charge electric capacity * 100%
Speed and discharge electric capacity and charge electric capacity [=] mAh/g In addition, as shown in Table 8, it could be found that both the capacity and Coulombic efficiency of Example 51 at high speed were significantly improved with the increase of current density. At 2C current density, the discharge capacity of Example 51 increased to 437 mAh/g, compared with that of Comparative Example 2, which was 300 mAh/g. As to high-speed retention rate, the discharge capacity of Example 50 increased to 40% compared with that of Comparative Example 2, which was 40%, and the discharge capacity of Example 51 was 44%. It indicated that the use of the lithium metal powder of the present invention for pre-lithiation not only improved the low-speed capacity, but also improved the high-speed capacity even more significantly. The pre-lithiated electrode of the lithium metal powder prepared by the present invention had good charge/discharge properties, Coulombic efficiency and high-speed capacity retention rate.

TABLE 8

| Speed | Comparative Example 2 | | Example 50 | | Example 51 | |
|---|---|---|---|---|---|---|
| | Discharge/Charge (mAh/g) | C.E. (%) | Discharge/Charge (mAh/g) | C.E. (%) | Discharge/Charge (mAh/g) | C.E. (%) |
| 0.1 C | 911/947 | 96.2 | 964/999 | 96.6 | 985/1003 | 98.2 |
| 0.3 C | 748/763 | 98.0 | 851/868 | 98.0 | 899/905 | 99.2 |
| 0.5 C | 617/624 | 98.8 | 723/733 | 98.7 | 816/817 | 99.9 |
| 0.8 C | 513/519 | 98.8 | 597/602 | 99.1 | 679/680 | 99.9 |
| 1 C | 455/459 | 99.1 | 534/550 | 99.2 | 605/605 | 100.0 |
| 2 C | 300/303 | 99.2 | 387/390 | 99.4 | 437/436 | 100.2 |
| High-speed retention rate (%) | 33 | | 40 | | 44 | |

Coulomb efficiency (C.E. %): Discharge/charge capacity * 100%
High-speed retention rates: Discharge capacity of 2 C/0.1 C * 100%
Speed and discharge capacity and charge capacity [=] mAh/g As shown in Table 9, the cycle retention rate of Comparative Example 2 after 100 cycles at 0.5C was 60.2%, while the 100-cycle cycle retention rate of Example 50 increased to 81.1%, and the 100-cycle cycle retention rate of Example 51 increased to 77.4%, showing that pre-lithiation was able to improve the first-cycle Coulombic efficiency and cycle life. The lithium metal powder used in the present invention could provide the negative electrode material with an additional source of lithium, and utilize the artificial SEI protective layer to improve the cycle life of the electrode.

TABLE 9

| | Comparative Example 2 | Example 50 | Example 51 |
|---|---|---|---|
| Cycle retention rate (%) | 60.2 | 81.1 | 77.4 |

Cycle retention rate: Capacity after 100 cycles* 100%/initial capacity

In summary, the lithium metal powder, preparing method thereof and electrode comprising the same provided in the present invention have excellent Coulombic efficiency and the thickness thereof is thinner than commercial lithium metal, which overcomes the difficulty in reducing the thickness of the commercial lithium metal and makes a breakthrough in electrical properties, effectively increasing the capacity and the high-speed charge/discharge capability. The lithium metal powder, preparing method thereof and electrode comprising the same provided in the present invention have great potential in the field of lithium batteries, and can significantly expand the performance of the lithium batteries.

Although the present invention has been explained in relation to a number of embodiments, it is to be understood that many other possible modifications and variations can be made without departing from the spirit and scope of the invention as hereinafter claimed.

What is claimed is:

1. A method for preparing lithium metal powder, comprising the following steps:
   providing a lithium metal material and an ultrasonication solution, wherein the ultrasonication solution comprises a metallic salt comprising lithium bis(trifluoromethanesulfonyl)imide (LiTFSI), lithium bis(fluorosulfonyl)imide (LiFSI) or a combination thereof;
   mixing the lithium metal material and the ultrasonication solution to form a mixed solution; and
   ultrasonically vibrating the mixed solution to pulverize the lithium metal material into a lithium metal powder, wherein the lithium metal powder is covered by a protective layer, and the lithium metal powder is floated to an upper layer of the mixed solution.

2. The method of claim 1, wherein the ultrasonication solution comprises a solvent comprising ethers, carbonates, or a combination thereof.

3. The method of claim 1, wherein the solvent comprises at least one selected from the group consisting of ethylene carbonate (EC), propylene carbonate (PC), gamma-butyrolactone (γ-BL), δ-valerolactone (δ-VL), dimethyl carbonate (DMC), diethyl carbonate (DEC), ethyl methyl carbonate (EMC), ethyl acetate (EA), methyl butanoate (MB), ethyl butanoate (EB), dimethoxymethane (DMM), dimethoxy ethane (DME), diethoxyethane (DEE), tetrahydrofuran (THF), 2-methyltetrahydrofuran (2-Me-THF), 1,3-dioxolane (1,3-DL), 4-methyl-1,3-dioxolane (4-Me-1,3-DL) and 2-methyl-1,3-dioxolane (2-Me-1,3-DL).

4. The method of claim 3, wherein the solvent comprises ethylene carbonate and diethyl carbonate.

5. The method of claim 4, wherein the volume ratio of ethylene carbonate to diethyl carbonate in the solvent is in a range between 1:10 and 10:1.

6. The method of claim 1, wherein the particle size of the lithium metal powder is in a range between 1 μm and 40 μm.

7. The method of claim 1, wherein the mixed solution is ultrasonically vibrated for an ultrasonication time ranging from 1 hour to 12 hours.

8. The method of claim 1, wherein the mixed solution is ultrasonically vibrated at an ultrasonication temperature ranging from 5° C. to 80° C.

9. The method of claim 1, wherein the protective layer comprises a protective layer material, and the protective layer material comprises sulfide, fluoride, or nitride, or a combination thereof.

* * * * *